US008671020B1

(12) United States Patent
Morrison et al.

(10) Patent No.: US 8,671,020 B1
(45) Date of Patent: Mar. 11, 2014

(54) CALL TRACKING SYSTEM UTILIZING A POOLING ALGORITHM

(71) Applicant: Marchex, Inc., Seattle, WA (US)

(72) Inventors: Amanda Morrison, Seattle, WA (US); Ambrose Sterr, Seattle, WA (US); Govind Ramanathan, Redmond, WA (US); Matthew Berk, Seattle, WA (US); Ziad Ismail, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 0 days.

(21) Appl. No.: 13/756,441

(22) Filed: Jan. 31, 2013

(51) Int. Cl.
*G06Q 30/00* (2012.01)
*H04M 15/00* (2006.01)

(52) U.S. Cl.
USPC .......... 705/14.41; 705/14.43; 705/14.52; 379/112.01; 379/114.13; 379/133

(58) Field of Classification Search
USPC .......... 379/100.03, 100.05, 100.06, 112.01; 705/14.4, 14.52, 14.55, 14.66, 14.67, 705/14.68, 14.69, 14.41, 14.43
See application file for complete search history.

(56) References Cited

U.S. PATENT DOCUMENTS

| 7,424,442 B2 | 9/2008 | Wong et al. | |
|---|---|---|---|
| 8,189,750 B2 * | 5/2012 | Metz et al. | 379/100.06 |
| 2005/0251445 A1 * | 11/2005 | Wong et al. | 705/14 |
| 2007/0121848 A1 * | 5/2007 | Faber et al. | 379/114.13 |
| 2007/0124206 A1 * | 5/2007 | Faber et al. | 705/14 |
| 2007/0124207 A1 * | 5/2007 | Faber et al. | 705/14 |
| 2007/0140451 A1 * | 6/2007 | Altberg et al. | 379/114.13 |
| 2008/0126209 A1 * | 5/2008 | Wong et al. | 705/14 |
| 2008/0255904 A1 | 10/2008 | Park et al. | |
| 2008/0275785 A1 * | 11/2008 | Altberg et al. | 705/14 |
| 2009/0067599 A1 | 3/2009 | Agarwal et al. | |
| 2009/0070205 A1 * | 3/2009 | Altberg et al. | 705/14 |
| 2010/0239084 A1 * | 9/2010 | Brown et al. | 379/218.01 |
| 2011/0066498 A1 * | 3/2011 | Wojcicki et al. | 705/14.55 |
| 2012/0004978 A1 | 1/2012 | Kothari et al. | |
| 2012/0027191 A1 | 2/2012 | Baril et al. | |
| 2012/0155624 A1 | 6/2012 | Chatterjee et al. | |
| 2012/0179524 A1 * | 7/2012 | Altberg et al. | 705/14.7 |
| 2013/0013422 A1 * | 1/2013 | Altberg et al. | 705/14.71 |
| 2013/0018712 A1 * | 1/2013 | Wong et al. | 705/14.4 |

OTHER PUBLICATIONS

U.S. Appl. No. 13/677,248, filed Nov. 14, 2012, Berk.

* cited by examiner

*Primary Examiner* — Binh Tieu
(74) *Attorney, Agent, or Firm* — Perkins Coie LLP

(57) ABSTRACT

A call tracking system and method that uses a pooling algorithm to manage a pool of telephone numbers that are utilized in advertisements. The pooling algorithm allows adjustments to be made to the pool in order to achieve a desired degree of call tracking accuracy performed by the system. The pooling algorithm may adjust the pool in terms of size, quality, or other metric, and assign phone numbers so as to meet the desired accuracy requirements. While additional numbers in a pool may increase accuracy, fewer numbers result in lower cost, and a balance may be struck based on the requirements of an advertiser. When a phone number is to be provided for an advertising campaign, the phone number may be selected from the pool randomly, in round-robin fashion, or according to criteria related to expected accuracy.

26 Claims, 18 Drawing Sheets

CALL TRACKING SYSTEM UTILIZING A POOLING ALGORITHM

BACKGROUND

It is desirable for advertisers and businesses to understand what advertisements are generating engagement with customers. More specifically, when a customer makes a phone call to a business, it is desirable to know if a prior customer engagement with a particular source (e.g., billboard, online ad, newspaper ad, etc.) resulted in the phone call. Call tracking systems may be utilized for correlating customer engagement to phone calls. The simplest technique for tracking customer engagements that result in phone calls is to designate a distinct phone number for each advertiser and source. However, when a significant number of advertisers and sources are involved, requiring a separate phone number for each advertiser/source combination can be costly and require significant operational work (e.g., for securing phone numbers to match each area, etc.).

A prior call tracking system which attempts to reduce costs by recycling telephone numbers is described in U.S. Pat. No. 7,424,442. The '442 patent discloses a method for providing pay-per-call performance based advertising. In accordance with the method, a telephone number is dynamically allocated to an advertisement on a just-in-time basis, and if the telephone number is not displayed or called for predefined periods of time, then the telephone number is unallocated and recycled. Telephone numbers may be recycled based on the time of last display in order to reduce potential confusion (i.e., the oldest telephone numbers that have not been displayed for the longest amount of time are utilized first).

While the techniques of the '442 patent for recycling phone numbers provide certain advantages, a significant amount of phone numbers may still be required by the system. As noted above, each additional phone number adds cost to the system. Moreover, other operational problems may also arise. For example, each additional phone number that is utilized by the call tracking system increases the likelihood that a spam call or a misdial will occur. Each spam call or misdial distorts the data that the call tracking system is collecting, and results in the call attribution functions of the call tracking system being less accurate.

The need exists for systems and methods that overcome the above problems, as well as provide additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1:
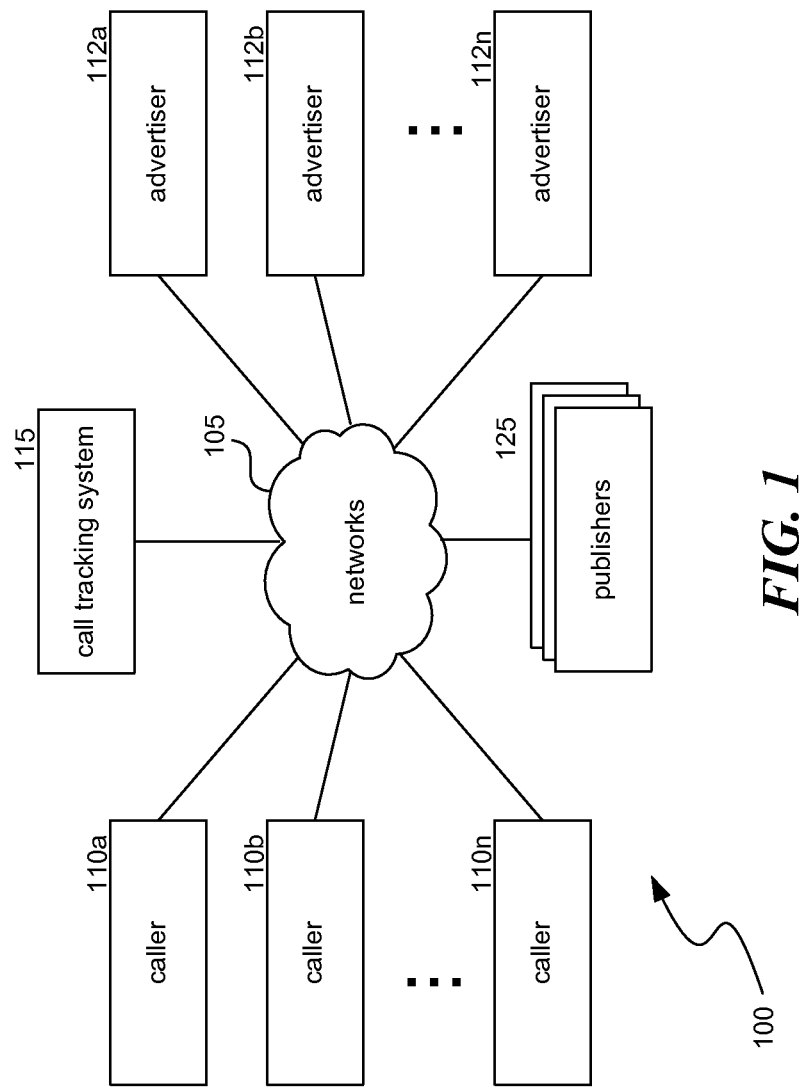
FIG. 1 is a block diagram illustrating an environment in which a call tracking system operates in some embodiments.

A call tracking system and methods that improve the ability to track telephone calls to published phone numbers is disclosed herein. Telephone numbers are distributed by the system for publication in one or more publications channels. A publication channel is any distribution path through which a telephone number is made visible to a caller or otherwise used to allow a potential caller to initiate a telephone call. A publication channel may be characterized by media, date, time, geography, or other factor that impacts the distribution scope. Publication channels therefore include, but are not limited to, a website, a portion of a website (e.g., in a "sports" section of a news website as compared to a "weather" section of a website), an advertising syndication network (e.g., served in advertisements in association with one set of keywords as compared to served in advertisements in association with a different set of keywords), on billboards, on a television channel, in a software application on a mobile device or fixed computing system, etc. The telephone numbers are published or used in advertisements or other content to enable a caller to make a call to the business, non-profit, government agency, or other entity associated with the number (each, an "advertiser"). The tracking system tracks calls to the distributed numbers and allows the performance of different publication channels to be measured and compared.

In some embodiments, the system uses an automated filtering function to filter unwanted calls and improve the accuracy of the call tracking system. The automated filtering function may involve spam filtering/blocking, interactive voice response, or other techniques. Prior call tracking systems typically suffer from the amount of noise in the system. Each additional phone number that is utilized by the call tracking system increases the likelihood that a spam call or a misdial will occur. Each spam call or misdial distorts the data and makes the call attribution functions of the system less accurate. By utilizing an automated filtering function, the disclosed system improves the accuracy of call tracking and allows, for example, advertisers to better track the performance of advertising campaigns that they undertake.

In some embodiments, the system utilizes a spam blocking module, such as a challenge-response test (e.g., a CAPTCHA), a blacklist looking for callers sharing certain criteria indicative of robo-dialed or spam calls, or other similar spam filters to block unwanted calls from being routed to an advertiser. By using a spam blocking module, the amount of noise in the call tracking system can be reduced and the attribution of calls correspondingly more accurate. In some embodiments, an interactive voice response (IVR) module is utilized to reduce the noise in the system by increasing the effort required to reach the advertiser, thus filtering or blocking unwanted calls. An IVR module also provides an advantage of acquiring additional data from each customer making a call, such as gathering data that allows the system to assess the mix of new versus existing customers in the received calls. For example, users can be prompted to "Press 1 if you are a new customer, Press 2 if you are an existing customers looking to upgrade, Press 3 if you are an existing customer calling for service," etc. Such data may be particularly beneficial to advertisers that are implementing campaigns targeted toward specific objectives like new customer acquisition. For objectives such as new customer acquisition, the ability to understand the mix of calls in an efficient manner using an IVR system is advantageous and improves the ability to measure the effectiveness of an advertising campaign. For example, the system may be able to associate different monetary values with new customers and with existing customers, and judge the effectiveness of advertising to each group.

In some embodiments, the call tracking system uses a pooling algorithm to manage a pool of telephone numbers that are published via publication channels. The pooling algorithm allows adjustments to be made to the telephone number pool utilized by the system in order to achieve a desired degree of call tracking accuracy performed by the system. For example, an advertiser may reduce costs by utilizing fewer or lower quality phone numbers when a lower level of accuracy is acceptable in an advertising campaign. The pooling algorithm may adjust the pool in terms of size, quality, or other metric, and assign phone numbers so as to meet the desired accuracy requirements. As an example, while additional numbers in a pool may increase accuracy, fewer numbers result in lower cost, and a balance may be struck based on the requirements of the advertiser. As another example, when a pool of phone numbers is allocated across a selected group of advertisers and a phone number is to be provided for a current web-based interaction, the phone number may be selected from the pool according to criteria related to expected accuracy. In some embodiments, the quality of a phone number may be defined according to factors such as the length of time since the phone number was last used for other campaigns, etc. Other criteria may also be utilized to increase monitoring accuracy, such as storing data regarding whether a telephone number has been previously allocated to a specific advertiser and maximizing the re-use of the number for the same advertiser. After a period of time, a telephone number may be returned to the pool and can be reused. The appropriate time for returning a number to the pool may depend on a variety of factors, such as statistics regarding the amount of time from when a number is displayed until a call is typically received.

In some embodiments, the call tracking system estimates a number of calls associated with a publication channel. The system tracks calls to the published number in order to assess the performance of the publication channel. The system may track all calls to measure performance, or may use a sampling algorithm to estimate performance. The tracked performance may in turn be utilized for various other functions such as determining the efficiency of or calculating the revenue share associated with an advertising campaign.

The use of sampling algorithms may be particularly beneficial when there is no need to calculate the efficiency for an individual advertiser, but instead a desire to calculate efficiency across a larger set of advertisers to determine the overall performance of a publisher and/or publication channel. Such a circumstance may exist when there is a large set of publishers (e.g., thousands), but for each advertiser only a limited number of calls is received (e.g., five calls per month, etc.). The sampling algorithm begins by selecting a group of advertisers to serve as a sample group. For the sample group, a call tracking number is allocated to each publication channel. For all other advertisers not in the sample group, only a single call tracking number (per advertiser) is allocated for all of the publication channels. The distribution of calls across each publication channel to advertisers in the sample group is assumed to be the same as calls to all advertisers not in the sample group, and the data from the sample group of advertisers is used to model the performance across all of the advertisers. Various techniques may be utilized to increase the accuracy of the publication channel distribution determined from the sample group. For example, the highest volume advertisers may be included in the sample group in order to increase the amount of distribution data, the number of advertisers in the sample group may be increased, or certain advertisers may be selected that have been demonstrated to be representative of the entire set of advertisers. Advertisers may also be rotated through the sample group over time in order to verify that the advertisers have consistent call distribution patterns.

In addition to, or in lieu of, a sampling algorithm based on advertisers, the system may use a sampling algorithm that is based on a percentage of ad requests to an advertiser. For example, 10% of the ad requests (e.g., every 10th advertisement that is displayed) to one or more advertisers may be selected as a sample group. For the sample group, a call tracking number is allocated to each publication channel. For all other advertisements not in the sample group, only a single call tracking number (per advertiser) is allocated for all of the publication channels. The distribution of calls across each publication channel to the advertisements in the sample group is assumed to be the same as calls to all advertisements not in the sample group, and the data from the sample group of advertisements is used to model the performance of all advertisements. Various techniques may be utilized to increase the accuracy of the publication channel distribution determined from the sample group. For example, the technique may be applied to high-volume advertisers, or to advertisers known to have representative distribution channels.

In various other embodiments, the call tracking system uses a pooled signal processing method to estimate a number of calls associated with a publication channel. In the pooled signal processing method, rather than each advertiser having a unique telephone number for each publication channel of calls, a small pool of numbers is allocated to each advertiser. Each different publication channel of calls is then given a unique set of phone numbers from the pool which overlaps with the sets given to other call publication channels within the campaign. At each impression (e.g., a website interaction with a potential customer) a phone number from the unique set of phone numbers is presented to the potential customer. The presented number may be randomly selected, selected using a round-robin algorithm, or selected in a different fashion. A best fit algorithm is then used to estimate the calls from each publication channel. Additional phone numbers can be added to the pool after the initial allocation, increasing the number of trackable publication channels. In various other embodiments, the call tracking system uses a dynamic signal processing method to estimate a number of calls associated with a publication channel. In accordance with the dynamic signal processing method, rather than each advertiser being provided with a unique number for each publication channel of calls, a smaller set of numbers is provided. By rotating a number used for call tracking across the publishers, a determination can be made of the percentage of calls associated with each publication channel.

Various embodiments of the invention are described below. The following description provides specific details for a thorough understanding and an enabling description of these embodiments. One skilled in the art will understand, however, that the invention may be practiced without many of these details. In addition, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram illustrating a representative environment 100 in which a call tracking system 115 operates. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions reside on a client computer.

Referring to the example of FIG. 1, the call tracking system 115 is communicably coupled to one or more callers 110 (shown individually as callers 110a-110n) via one or more networks 105. The call tracking system 115 is also communicably coupled to one or more advertisers 112 (shown individually as advertisers 112a-112n) via the networks 105. A caller 110 may be an individual person, a business, a governmental agency, or any other entity capable of initiating telephone calls in response to advertisements for products or services. An advertiser 112 similarly may be an individual person, a business, a governmental agency, or any other entity capable of receiving telephone calls in response to advertisements that are placed by the advertiser. As will described in additional detail herein, the call tracking system 115 is capable of monitoring when telephone calls are made from the callers 110 to the advertisers 112. Networks 105 are any network suitable for communicably coupling the callers 110, the advertisers 112 and the call tracking system 115, such as a Voice over Internet Protocol (VoIP) network, a cellular telecommunications network, a public-switched telephone network (PSTN), any combination of these networks, or any other suitable network that can carry data and/or voice telecommunications.

As described in more detail herein, the call tracking system 115 assigns telephone numbers out of a pool of telephone numbers to advertisers 112 for use in advertising campaigns or other circumstance in which the advertiser desires to use a temporary telephone number associated with the advertiser. Typically, the advertiser 112 already has a permanent telephone number and the call tracking system 115 assigns other telephone numbers to the advertiser 112 for temporary use. For example, an advertiser 112 may have a telephone number for one geographic locale such as New York City (with a 212 area code), but wish to have telephone numbers in other geographic locales such as Detroit (with a 313 area code) or Seattle (with a 206 area code). The call tracking system 115 stores associations between the Detroit and Seattle telephone numbers and the New York City telephone number. When a caller 110 calls the Detroit telephone number, the call tracking system 115 causes the telephone call to be forwarded or routed to the New York City telephone number.

The callers 110, advertisers 112 and call tracking system 115 may also communicate with each other and with publishers 125 via public or private networks 105, including for example, the internet. The call tracking system 115 may provide an interface such as a website that allows system users to access the call tracking system 115, and which provides data regarding the call tracking services and functions, as will be described in more detail below. The publishers 125 provide content which displays or uses call tracking phone numbers provided from the call tracking system 115 to enable callers to call advertisers. The call tracking phone numbers are typically integrated into advertisements that are displayed on websites, software applications, televisions, advertising syndication networks, etc. The call tracking phone numbers may be visually displayed to potential callers in the advertisement, or may be hidden from a caller yet used to route a call when the caller takes a desired action associated with the advertisement (e.g., when the caller clicks on a button to make a call). The advertisements may be directly displayed on content associated with the advertiser (e.g., on an advertiser's website), or may be distributed via advertising syndicators and displayed on a variety of different types of content channels, such as search engines, content producers, content aggregators, etc. Callers 110 view the advertisements displaying or using the call tracking phone numbers and place calls to the advertisers associated with the advertisements. A record of caller interactions with websites may be captured and provided to the call tracking system 115 and/or to the advertisers 112.

The callers 110 and advertisers 112 may have mobile devices and computers that are utilized for communicating with each other and with the publishers 125 through the network 105. Any mobile devices may communicate wirelessly with a base station or access point using a wireless mobile telephone standard, such as the Global System for Mobile Communications (GSM), Long Term Evolution (LTE), or another wireless standard, such as IEEE 802.11, and the base station or access point may communicate with the call tracking system 115 and publishers 125 via the network 105. Computers may communicate through the network 105 using, for example, TCP/IP protocols.

Figure 2:
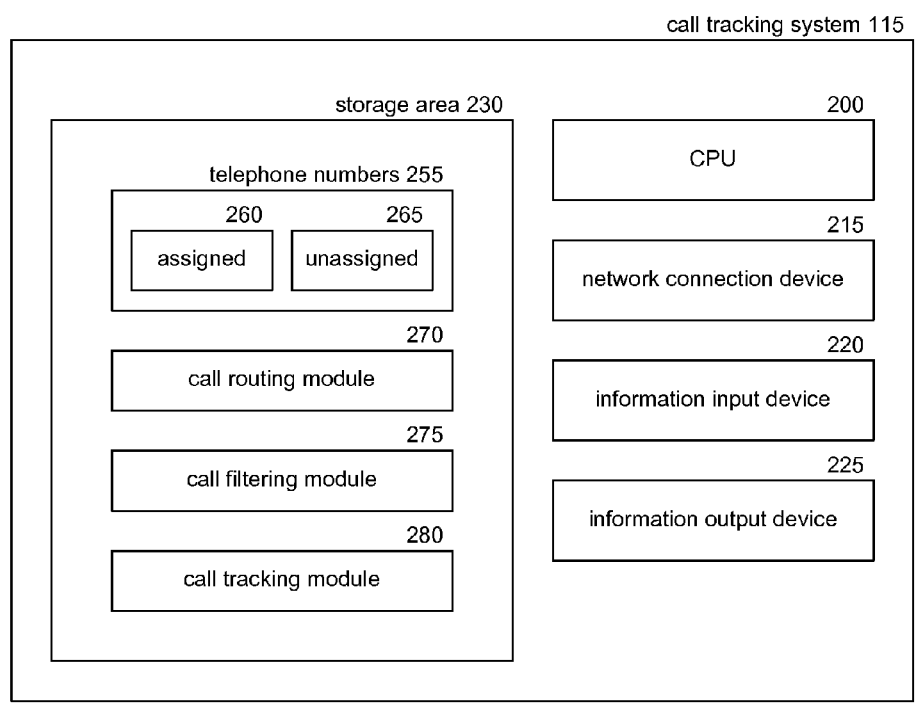
FIG. 2 is a block diagram illustrating the call tracking system in more detail.

FIG. 2 is a block diagram illustrating the call tracking system 115 in more detail. The call tracking system 115 includes a storage area 230. The storage area 230 includes software modules and data that, when executed or operated on by a processor, performs certain of the methods or functions described herein. The storage area may include components, subcomponents, or other logical entities that assist with or enable the performance of some or all of these methods or functions. For example, the modules may in some embodiments be utilized to implement an automated filtering function, a pooling algorithm, and a method to estimate a number of calls associated with a publication channel, each of which will be described in more detail below with respect to FIGS. 3-17.

The stored data includes a set of telephone numbers 255. Telephone calls to the telephone numbers 255 are routed by the call tracking system 115. The telephone numbers 255 include both a set of assigned telephone numbers 260 and a set of unassigned telephone numbers 265. Assigned telephone numbers 260 are those telephone numbers that are currently assigned to advertisers 112 for use in advertising campaigns. The call tracking system 115 tracks a telephone call that is routed to an assigned telephone number 260 of the associated advertiser 112. Unassigned telephone numbers 265 are those telephone numbers that are not currently assigned to an advertiser 112. Accordingly, the call tracking system 115 does not track telephone calls to an unassigned telephone number 265. Rather, the call tracking system 115 may provide a caller 110 making a telephone call to an unassigned telephone number 265 with an indication that the telephone number is unassigned.

Telephone numbers may be assigned in real-time or near real-time by the call tracking system 115 when a publisher wants to serve an advertisement for a specific business and needs a call tracking number. In such a case, the call tracking system may assign the call tracking number on demand and for a short time duration. Telephone numbers may also be assigned by the call tracking system 115 in bulk, in advance of the intended use, and for a long time duration. For example, the call tracking system may send a set of call tracking numbers to a publisher. Some of the advertisers may be assigned a call tracking number that is unique to the publisher, but other advertisers may be assigned a call tracking number that is shared across publishers. The publisher uses the set of call tracking numbers as they choose as the user interacts with their content. Sets of call tracking numbers provided to publishers may be refreshed periodically, such as daily, weekly, etc.

The stored data also includes a call routing module 270, which maintains the associations between assigned telephone numbers 260 and advertisers 112. The stored data also includes a call filtering module 275, which includes data structures that the call tracking system 115 can use to filter (e.g., block) certain telephone calls to the telephone numbers 255. The stored data also includes a call tracking module 280 that compiles and manages data about telephone calls received by the call tracking system 115.

It will be appreciated that storage area 230 may be volatile memory, non-volatile memory, a persistent storage device (for example, an optical drive, a magnetic hard drive, a tape of a tape library, etc.), or any combination thereof.

The call tracking system 115 further includes one or more central processing units (CPU) 200 for executing software stored in the storage area 230, and a computer-readable media drive for reading information or installing software from tangible computer-readable storage media, such as a floppy disk, a CD-ROM, a DVD, a USB flash drive, and/or other tangible computer-readable storage media. The call tracking system 115 also includes one or more of the following: a network connection device 215 for connecting to a network, an information input device 220 (for example, a mouse, a keyboard, etc.), and an information output device 225 (for example, a display).

Figure 3:
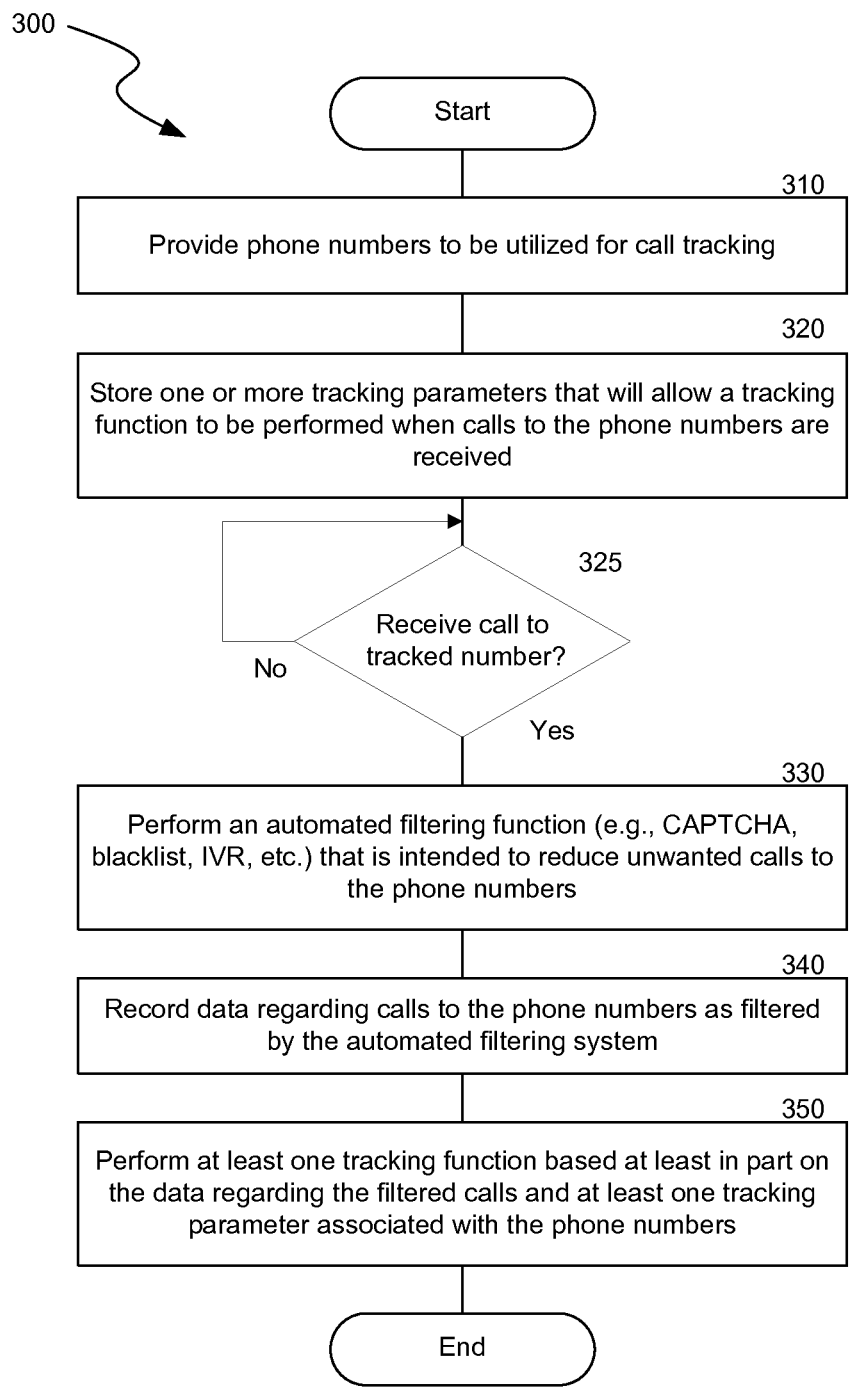
FIG. 3 is a flowchart showing a method implemented by the call tracking system that utilizes an automated filtering function to reduce unwanted calls to phone numbers utilized for call tracking.
Figure 5:
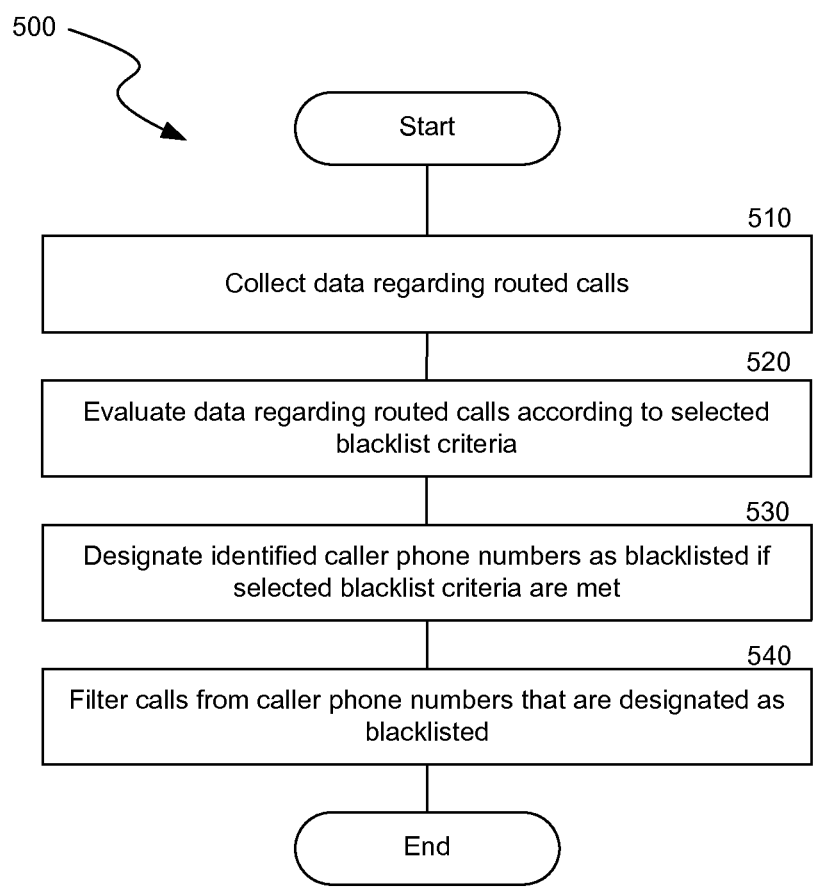
FIG. 5 is a flowchart showing a method that determines and utilizes a blacklist as an automated filtering function.
Figure 6:
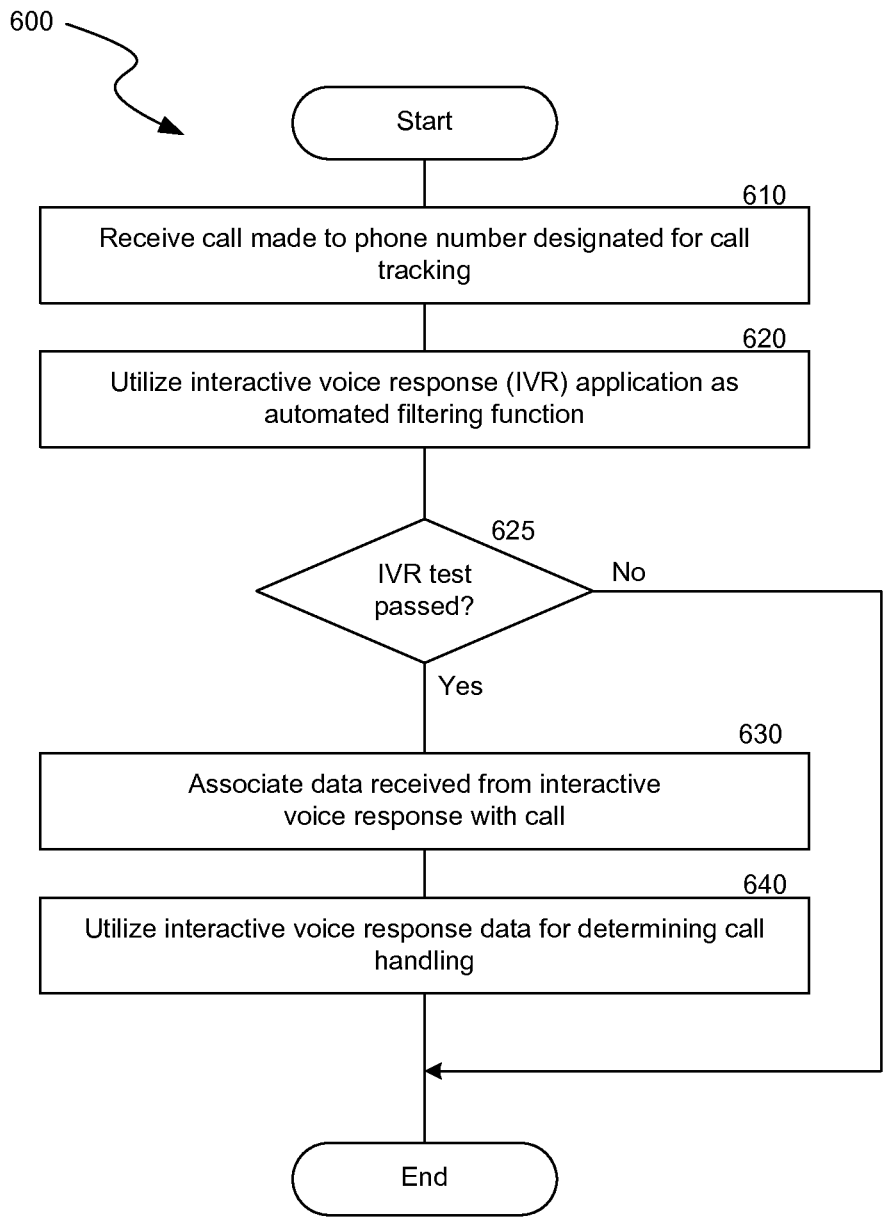
FIG. 6 is a flowchart showing a method that utilizes an interactive voice response as an automated filtering function.

FIG. 3 is a flowchart showing a method 300 implemented by the call tracking system 115 for reducing unwanted calls to phone numbers utilized for call tracking. In other words, some calls to the phone numbers utilized for call tracking may be considered illegitimate, unwanted, or otherwise undesirable. For example, in some instances, the call originator may be an automatic telephone dialer, a robo-dialer, or other initiator of automatic telephone calls that makes a large number of calls. Such calls to phone numbers utilized for call tracking distort the call tracking data and make the call attribution functions of the system less accurate. Similar issues exist for calls that are accidentally made to phone numbers utilized for call tracking, such as by misdials. In general, each additional phone number that is utilized by the call tracking system increases the likelihood of noise occurring (e.g., spam calls, misdials, etc.). As will be described in more detail below, FIG. 3 is directed to a general method for reducing unwanted calls to phone numbers utilized for call tracking, while FIGS. 4-6 are directed to more specific aspects for reducing unwanted calls.

As shown in FIG. 3, at a block 310, phone numbers are provided by the call tracking system 115 to be utilized for call tracking. The phone numbers may be provided directly to advertisers, to publishers, to advertising brokers, to advertising syndicators, or to other parties that use the provided phone numbers in one or more publication channels. At a block 320, one or more tracking parameters are stored by the system in association with the provided phone numbers. The tracking parameters allow a tracking function to be performed when calls to the phone numbers are received. The tracking parameters may include an identification of the publication channel or channels that the phone numbers were assigned to, the advertiser that the numbers are assigned to, dates and times of assignment, data regarding previous assignment of the numbers, etc.

At a decision block 325, the tracking system waits to detect a call to the provided phone numbers. At a block 330, the tracking system performs an automated filtering function (e.g., CAPTCHA, blacklist, IVR, etc.) that is intended to reduce unwanted calls to the phone numbers. Calls that are identified as unwanted are halted, terminated, or otherwise handled in a lower-priority fashion by the system. Additional details about the automated filtering functions will be provided with respect to FIGS. 4-6. For those call that are not halted, terminated, or de-prioritized by the automated filtering function, at a block 340, the tracking system stores data characterizing the calls to the phone numbers. The data may include the caller telephone number associated with the caller (as identified using Caller ID or other similar technique), the date and time of day that the call was received, the length of the call, and other details that can be ascertained about the call or its outcome. At a block 350, at least one tracking function (e.g., estimating a number of calls associated with a selected publication channel, etc.) is performed by the system based at least in part on the data about the received calls and at least one tracking parameter associated with the phone numbers to which those calls were placed.

Figure 4:
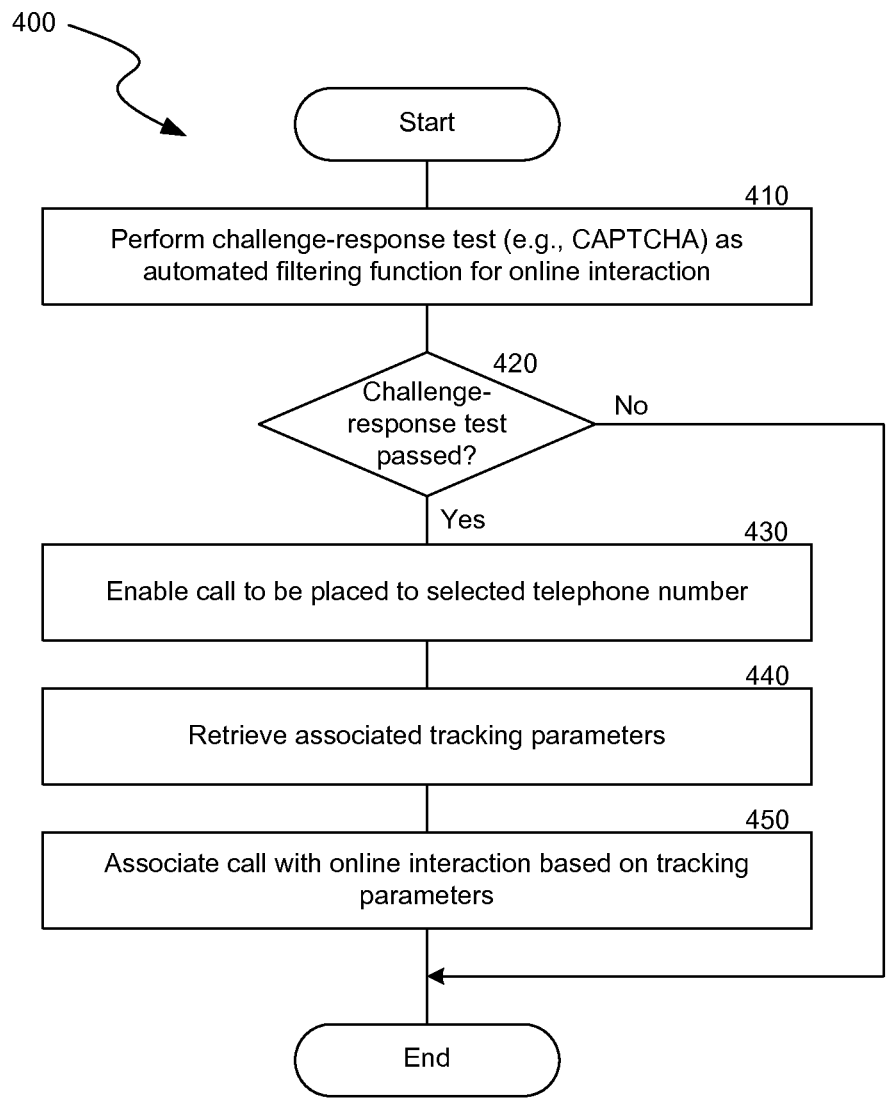
FIG. 4 is a flowchart showing a method that utilizes a challenge-response test as an automated filtering function.

FIG. 4 is a flowchart showing a method 400 implemented by the call tracking system 115 for performing a challenge-response test as an automated filtering function. In some circumstances, the call tracking number may be displayed to a potential caller in an online advertisement. As part of the advertisement, the potential caller may be provided the opportunity to select the displayed phone number in order to place a call to the phone number using Voice Over IP (VoIP) or other communications circuit. An interface to allow a caller to place a call to a displayed phone number is described in U.S. patent application Ser. No. 13/677,248, entitled "SYSTEM AND METHOD TO CUSTOMIZE A CONNECTION INTERFACE FOR MULTIMODAL CONNECTION TO A TELEPHONE NUMBER," filed on Nov. 14, 2012, and incorporated herein by reference in its entirety. In circumstances when the caller selects a phone number to connect with using a computing device, the call tracking system may first cause a challenge-response test to be displayed to the caller prior to allowing the call to be made. At a block 410, the system causes a challenge-response test (e.g., CAPTCHA) to be displayed or played to a user that desires to make a call to a telephone number that is being tracked. The challenge-response test is used as an automated filtering function for an online interaction. The challenge-response test may be displayed to the caller prior to the actual display of the telephone number to the caller, or the challenge-response test may be displayed to the caller after display of the telephone number but before the call is allowed to be placed by the caller. The use of a CAPTCHA or other challenge-response test effectively filters robocallers and other automated calling systems.

At a decision block 420, a determination is made by the system as to whether the challenge-response test was passed. If the challenge-response test was not passed, then the call is terminated and processing ends. If the challenge-response test was passed, then processing continues to a block 430, where the system allows the call to be placed to the telephone number. The system may allow the call to be placed by displaying the telephone number to the caller, enabling the caller to connect by clicking on the screen, or enabling the voice channel to allow the call to be connected. At a block 440, the system retrieves the tracking parameters that are associated with the call. As previously noted, the tracking parameters may include the identification of the publication channel or channels that the phone numbers were assigned to, the advertiser that the numbers are assigned to, dates and times of assignment, data regarding previous assignment of the numbers, etc. At a block 450, the call is associated by the system with the online interaction based on the retrieved tracking parameters that are associated with the phone number.

Rather than terminating the call at block 420, it will be appreciated that the system may instead assign the unwanted call to a lower-priority process than calls that are routed. For example, the system may place the call into a customer service queue having a longer wait time, may route the call to voicemail rather than a live operator, may elicit information from the caller using an IVR system rather than a live operator, etc. Various different ways may be used by the system to deprioritize the call and not give it the priority or service that is provided to routed calls.

FIG. 5 is a flowchart showing a method 500 implemented by the call tracking system 115 for determining and utilizing a blacklist as an automated filtering function. At a block 510, data is collected by the call tracking system regarding routed calls. The collected data may include the caller's telephone number associated with the call (e.g., as identified using Caller ID), the time and date of the call, a characterization of any interactions that occur during the call, etc. At a block 520, the data regarding routed calls is evaluated by the system according to selected blacklist criteria. It will be appreciated that by providing and monitoring multiple phone numbers that are each intended for individual customer interactions, the tracking system may more easily detect spam calls or other unwanted calls and place the identified caller numbers on a blacklist of callers that should not be routed. For example, when a single incoming caller phone number is detected as making multiple calls within a certain period of time to different tracking system phone numbers that are being monitored, this may indicate that a spam caller or robo-dialer may be making the calls. One criteria used by the system to assess whether callers should be blacklisted is therefore to determine whether a caller exceeds a predetermined number of calls within a predetermined period of time (e.g., 5 calls to the tracking system phone numbers within 10 minutes, etc.). As another example of criteria that may be monitored, the system may look at the success of calls placed in the past by the identified caller. The system may measure "success" by such factors as call duration (consistently short calls may be indicative of a robo-dialer) or IVR or CAPTCHA success rates (spam callers will often consistently fail IVRs and CAPTCHAs). Yet another example of criteria that can be assessed by the system is the destination of the calls made by the caller. A caller making calls to multiple businesses across multiple business categories within a short period of time may reflect a robo-dialer (in contrast, multiple calls to businesses within the same business segment is a common calling pattern). One or more of these criteria may be used by the system to identify caller telephone numbers that are to be blacklisted.

At a block 530, caller telephone numbers are designated by the system as blacklisted if the record of calls that have originated from those caller telephone numbers meets the blacklist criteria. Once added to the blacklist, any subsequent calls that are identified as originating from the blacklisted caller telephone numbers are blocked by the system from being completed. At a block 540, calls from incoming caller telephone numbers that are designated as blacklisted are therefore filtered by the system and the call terminated. The blacklisted telephone number may remain permanently on the blacklist, or may be removed from the blacklist after a certain time period elapses if the caller does not re-offend during the elapsed time period.

FIG. 6 is a flowchart showing a method 600 implemented by the call tracking system 115 for utilizing an interactive voice response as an automated filtering function. At a block 610, a call made to a phone number designated for call tracking is received by the system. At a block 620, the system uses an interactive voice response (IVR) application as an automated filtering function. In various embodiments, the IVR application may require the caller to provide data regarding the nature of the call before the system allows the call to be routed to the appropriate telephone number. For example, the system may instruct a caller to press or say "1" if they are a new customer, press or say "2" if they are an existing customer looking to upgrade, press or say "3" if they are an existing customer calling for service, etc. As another example, the system may repeat the name of the business to confirm that the caller is really intending to call that business. For example, the system may state "You have reached Business X in Seattle. Press or say '1' if you are a new customer and press or say '2' if you are an existing customer." In addition to eliciting additional information about a caller, the use of an IVR application is effective to filter robo-dialers and other automated calling systems.

At a decision block 625, the system assess whether the caller has responded correctly to the IVR inquiry. If the caller doesn't respond to the IVR inquiry, or responds in an incorrect manner to the IVR inquiry, the system may screen the call and not allow the call to be routed to the desired destination phone number (i.e., the call is terminated). Alternatively, as noted above, the system may instead assign the unwanted call to a lower-priority process than calls that are routed. If the caller responds correctly to the IVR inquiry, however, processing continues to a block 630.

At block 630, data received from the interactive voice response application is associated with the call. That is, the system stores the caller's response to the IVR inquiries such that they can later be analyzed as part of the call record. At a block 640, the call tracking system uses the interactive voice response data to determine how the call should be routed and/or processed. For example, the system may route the call differently or bill the advertiser differently depending on whether the caller is a new customer or an existing customer. As another example, the system may route the call differently depending on the particular product and/or service that precipitated the call, as determined by the caller's response to various IVR questions about the reason for the call.

It will be appreciated that the interactive voice response data may be particularly beneficial in certain implementations. For example, in addition to utilizing the interactive voice response to block or filter calls, the additional interactive voice response data and the analysis of the caller interaction on the call enables an advertiser to understand the mix of calls in an efficient manner. Understanding new versus existing customer mix from an advertising spend is important to assessing the relative ROI of advertising spending and how to allocate future advertising spending.

Figure 7:
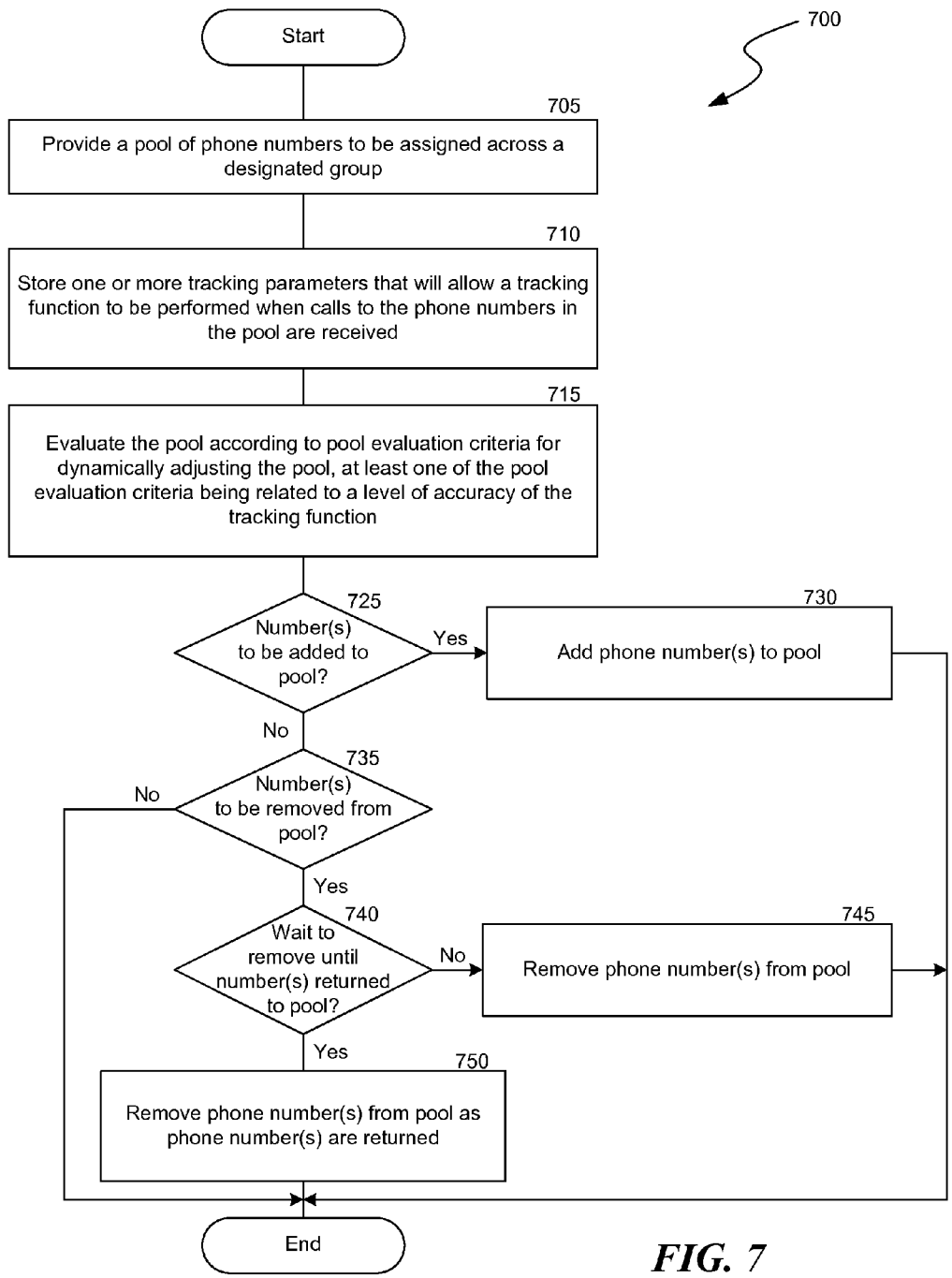
FIG. 7 is a flowchart showing a method implemented by the call tracking system for adjusting a pool of phone numbers utilized for call tracking.
Figure 8:
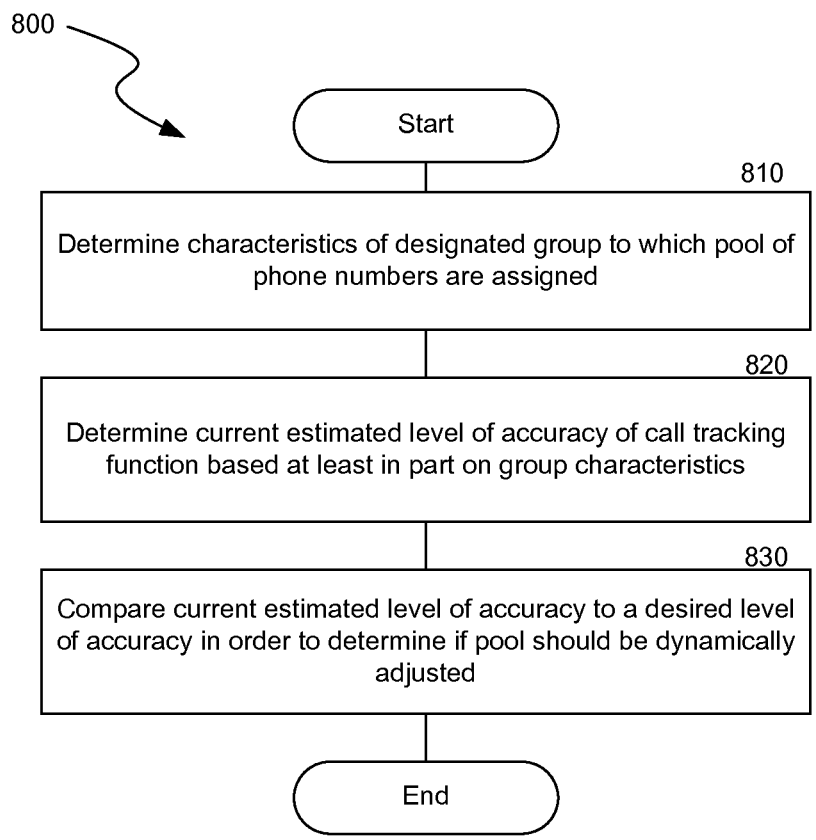
FIG. 8 is a flowchart showing a method for determining if a pool of phone numbers should be dynamically adjusted in order to achieve a desired level of accuracy.
Figure 9:
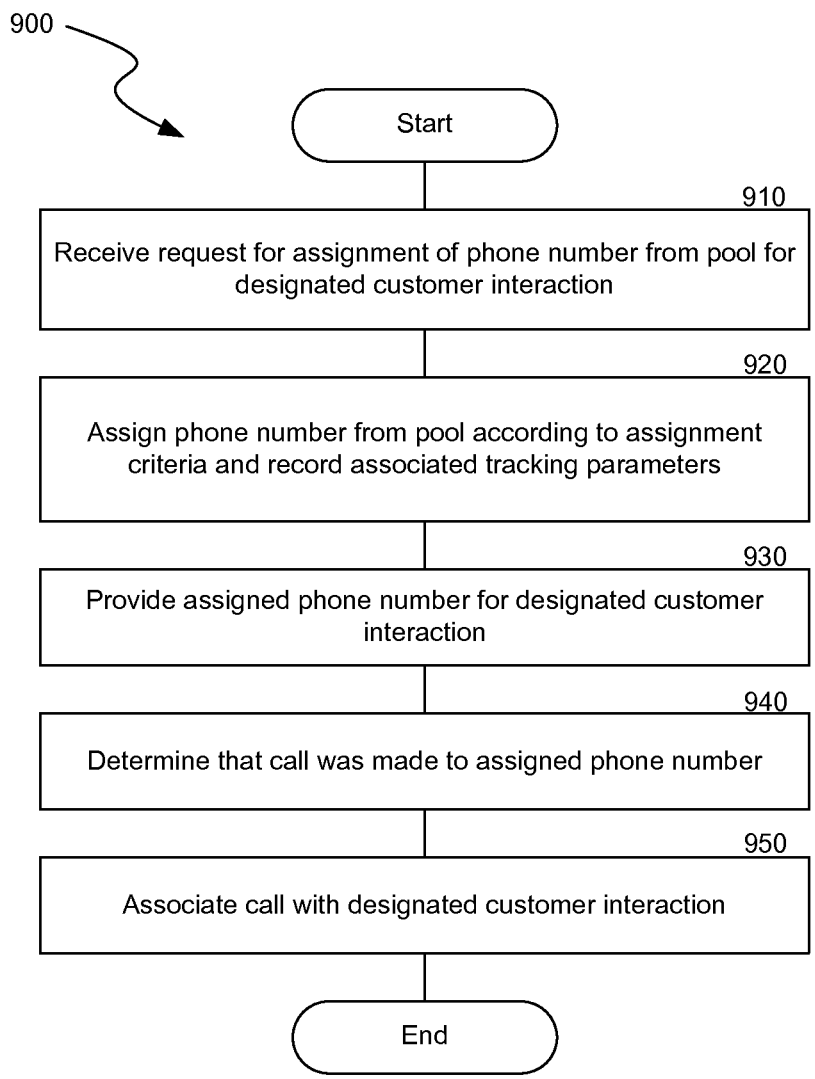
FIG. 9 is a flowchart showing a method for assigning phone numbers from a pool according to selected assignment criteria.
Figure 10:
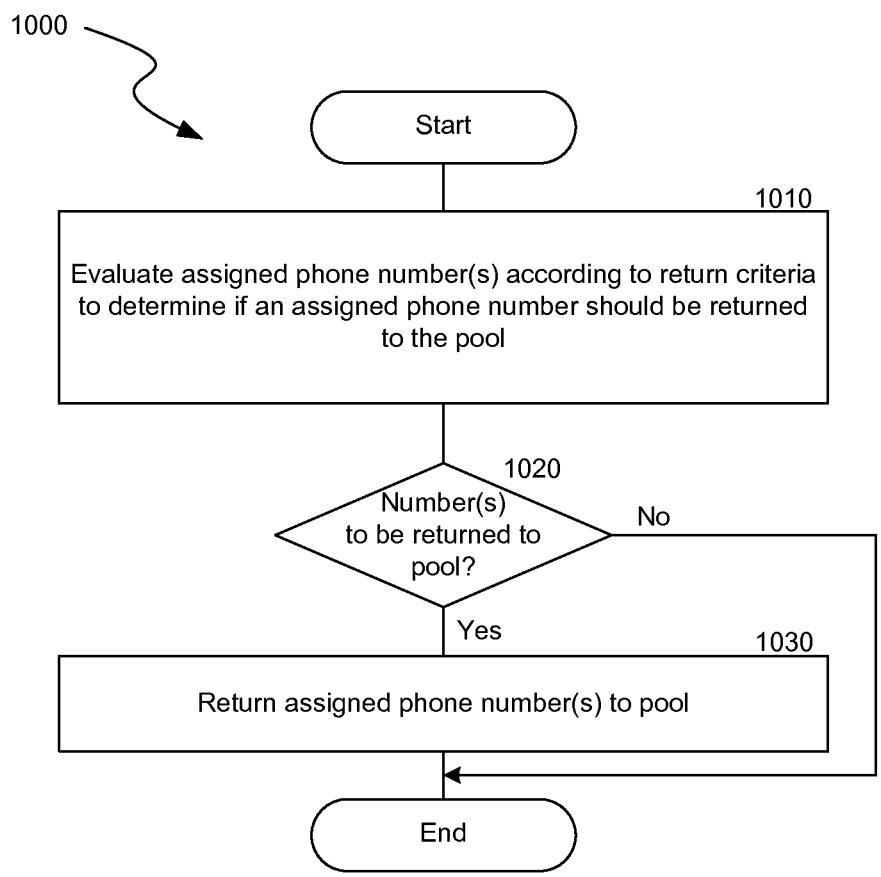
FIG. 10 is a flowchart showing a method for determining if assigned phone numbers should be returned to a pool.

FIG. 7 is a flowchart showing a method 700 implemented by the call tracking system 115 for managing a pool of phone numbers that are utilized in advertisements. As will be described in more detail below, adjustments may be made to the pool of phone numbers utilized by the system in order to achieve a desired degree of call tracking accuracy performed by the system. While additional numbers in a pool may increase accuracy, fewer numbers typically result in lower cost. It is also true that having too many numbers may sometimes reduce accuracy because of increases in call spam to the larger set of numbers. By adjusting pool size, the system is therefore able to strike a balance between accuracy and cost based on the requirements of the advertiser. For example, an advertiser may reduce costs by utilizing fewer or lower quality phone numbers when a lower level of accuracy is acceptable in an advertising campaign. Conversely, an advertiser may desire to increase costs when a higher level of accuracy is required for an advertising campaign. The pool may be adjusted in terms of size, quality, or other metric, and phone numbers may be assigned so as to meet the desired accuracy requirements that are requested by the advertiser. As will be described in more detail below, FIG. 7 shows a general method for managing the pool of phone numbers, while FIGS. 8-10 illustrate more specific techniques and aspects related to the management of the pool of phone numbers.

As shown in FIG. 7, at a block 705, a pool of phone numbers is provided by the call tracking system 115 to be assigned across a designated group of advertisers. As described in more detail with respect to FIGS. 12A and 12B, the call tracking system may select a designated group of advertisers to serve as a sample group or may select a percentage of ad requests (e.g., every 10th advertisement that is displayed) for one or more advertisers to serve as the sample group. For the sample group, a call tracking number is allocated to each publication channel. For all other advertisers not in the sample group, only a single call tracking number is allocated for all of the publication channels.

At a block 710, one or more tracking parameters are stored by the system in association with the provided phone numbers. The tracking parameters allow a tracking function to be performed by the system when calls to the phone numbers in the pool are received. The tracking parameters may include an identification of the publication channel or channels that the phone numbers are assigned to, the advertiser that the numbers are assigned to, dates and times of assignment, data regarding previous assignment of the numbers, etc. At a block 715, the pool is evaluated by the system according to pool evaluation criteria for dynamically adjusting the pool. At least one of the pool evaluation criteria is related to a level of accuracy of the tracking function. For example, one of the pool evaluation criteria may be related to a desired margin of error for the tracking function.

At a decision block 725, a determination is made by the system as to whether phone numbers are to be added to the pool. As will be described in more detail below, in some embodiments phone numbers may be added or removed from the pool in order to adjust the pool in terms of size, quality, or other metric. If phone numbers are to be added to the pool, then processing continues to a block 730, where one or more phone numbers are added to the pool. The phone numbers that are to be added to the pool may be selected randomly by the system or according to criteria such as length of time since the phone number was last used, the geographic location in which the phone number was last used, etc. If phone numbers are not to be added to the pool, then processing continues to a decision block 735.

At decision block 735, a determination is made by the system as to whether phone numbers are to be removed from the pool. Phone numbers may be removed from the pool for a variety of reasons. For example, underutilized phone numbers may be removed from the pool and re-used in different pools. Underutilized phone numbers may result from an initial poor prediction on appropriate pool sizing, or lesser traffic than anticipated to campaigns that are utilizing numbers in the pool. As another example, a tracking phone number may be removed from the pool when the phone number starts to receive an excessive number of unintended or unwanted phone calls. Spam calls can increase to a tracking phone number, for example, if a popular phone number is numerically similar or keystroke similar to the tracking phone number. If detected spam calls to a phone number in the pool exceed a certain threshold, the system may remove the problematic phone number from the pool. If phone numbers are not to be removed from the pool, then the processing ends. If phone numbers are to be removed from the pool, then the processing continues to a decision block 740.

At decision block 740, a determination is made by the system as to whether to wait to remove the phone numbers from the pool until other phone numbers are returned to the pool. In other words, in various embodiments even when the pooling algorithm has determined that phone numbers should be removed from the pool, it may be desirable to wait for some of the assigned phone numbers to be returned to the pool. Examples of such a circumstance may include if there are no unassigned phone numbers currently left in the pool, if there are an insufficient number of unassigned phone numbers currently in the pool for the pool to operate properly, if specific phone numbers that are to be removed are currently assigned, etc. If the system determines that there is no need to wait for other phone numbers to be returned to the pool, then the processing continues to a block 745, where the system removes one or more phone numbers from the pool. The phone numbers that are removed from the pool may be selected randomly, in a round-robin fashion, or according to criteria such as length of time since last use, etc. If the system determines that it should wait until phone numbers are returned to the pool, then the processing continues to a block 750, where phone numbers are removed from the pool as phone numbers are returned to the pool.

FIG. 8 is a flowchart showing a method 800 implemented by the call tracking system 115 for determining the characteristics of a designated group of advertisers and publishers for evaluating if a pool of phone numbers should be dynamically adjusted for that group. At a block 810, the system assesses the characteristics of a designated group of advertisers and publishers to which a pool of phone numbers is assigned. One of the characteristics of the group that may be assessed is the number of combinations of advertisers and publication channels sharing phone numbers. If too many combinations of advertisers/publication channels share phone numbers, the pool of phone numbers should be increased. Another example of a group characteristic that may be assessed is how frequently call tracking numbers have to be recycled to meet the requests from publishers. If call tracking numbers need to be recycled too soon, then more call tracking numbers are needed. At a block 820, the system estimates the current level of call tracking accuracy based at least in part on the group characteristics. For example, the system may estimate a number of calls associated with a publication channel, and calculate a level of accuracy related to a margin of error of those calls. At a block 830, the system compares the current estimated level of accuracy to a desired level of accuracy in order to determine if the pool should be dynamically adjusted. The pool may be dynamically adjusted by changing the size and/or composition of the pool, the frequency of reuse of the pool, etc.

With regard to the relationship of the size and/or composition of the pool to the level of accuracy, it will be appreciated that adding more telephone numbers that have been less frequently used will generally increase the accuracy of the call tracking functions. However, as noted above, increasing the accuracy in this manner will generally also increase costs. Conversely, decreasing the number of phone numbers in the pool will generally decrease the accuracy of call tracking but will also decrease costs. By adjusting the pool of phone numbers to achieve an acceptable level of accuracy with an acceptable associated cost, the requirements for various advertisers may be met.

FIG. 9 is a flowchart showing a method 900 implemented by the call tracking system 115 for assigning phone numbers from a pool according to selected assignment criteria. At a block 910, a request is received by the system for an assignment of a phone number from the pool for a designated customer interaction. For example, a customer interaction may occur when a customer accesses a web page. The web page, or an advertising service on the web page, sends the request to the system for the phone number. At a block 920, a phone number is assigned by the system from the pool according to assignment criteria. The assignment criteria may include factors such as which phone number has been unused for the longest period of time, which phone number has been previously used with the requesting business, thereby maximizing reuse of a phone number for the same business, etc. It will be appreciated that certain assignment criteria may be directed to reducing confusion, as well as increasing the monitoring accuracy of the system. For example, by reusing a phone number for the same business, a call based on an older customer interaction will still reach the correct business. At a block 930, the system provides the assigned phone number to the requesting service for use in the designated customer interaction. At a block 940, the system determines that a call has been made to the assigned phone number. The system may determine that the call has been made by actually routing the call itself, or by receiving telecommunication records from network operators or from advertisers indicating that the call was made and correlating those records with information of when the corresponding telephone numbers were presented. At a block 950, the system associates the call with the corresponding customer interaction. The association of the call with the designated customer interaction may be made based on tracking parameters, such as by correlating the time and presentation of the number to the customer with the time of the subsequent call being placed to the advertiser. The system may also associate each call with several customer interactions on a fractional basis (e.g., a call is attributed 25% to four different customer interactions) if it is unclear which customer interaction drove the call.

FIG. 10 is a flowchart showing a method 1000 implemented by the call tracking system 115 for determining if assigned phone numbers should be returned to a pool. At a block 1010, assigned phone number(s) are evaluated by the system according to return criteria to determine if an assigned phone number should be returned to the pool. For example, one of the return criteria may be the amount of time that has passed since the phone number was provided to the customer. If the customer has not utilized the phone number within a certain period, the system may assume that the customer does not intend to call the phone number and that the phone number may therefore be reused. At a decision block 1020, a determination is made by the system as to whether one or more numbers are to be returned to the pool. If no numbers are to be returned to the pool, then the processing ends. If one or more number(s) are to be returned to the pool, then the processing continues to a block 1030, where the previously-assigned phone number(s) are returned to the pool. After being returned to the pool, the system may reuse the returned phone numbers in subsequent tracking requests.

Figure 11:
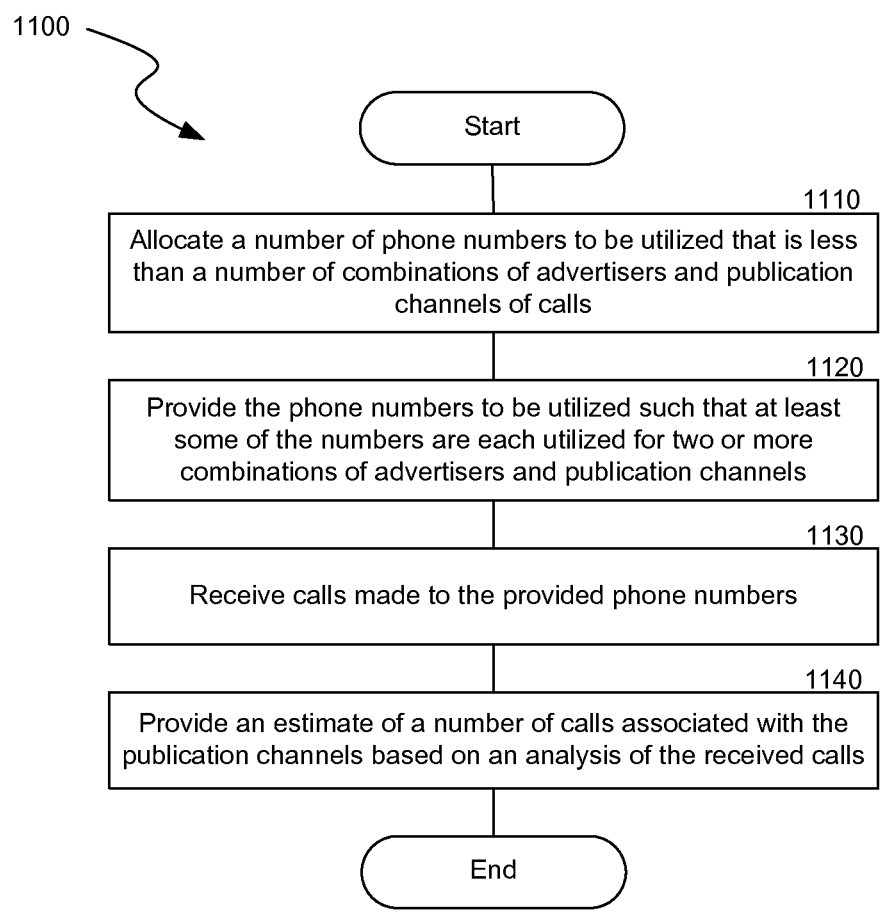
FIG. 11 is a flowchart showing a method implemented by the call tracking system for estimating a number of calls associated with publication channels.

FIG. 11 is a flowchart showing a method 1100 implemented by the call tracking system 115 for estimating a number of calls associated with a publication channel. As noted above, a publication channel is a particular channel through which a telephone number is published, such as on a website, on a portion of a website (e.g., in a "sports" section of a news website as compared to a "weather" section of a website), via an advertising syndication network (e.g., served in association with one set of keywords as compared to served in association with a different set of keywords), on billboards, on a television channel, etc. As will be described in more detail below, in various embodiments, sampling algorithms, pooled or dynamic signal processing techniques, etc., may be utilized for the estimation of the number of calls associated with the publication channel. Various functions may be performed based on the estimated calls associated with publication channels, such as determining the efficiency of or calculating the revenue share associated with an advertising campaign. As will be described in more detail below, FIG. 11 is directed to a general method for estimating a number of calls associated with a publication channel, while FIGS. 12-17 are directed toward more specific techniques and aspects related to estimating a number of calls associated with a publication channel.

As shown in FIG. 11, at a block 1110, a number of phone numbers are allocated by the call tracking system 115 for tracking purposes. The number of allocated numbers is less than the number of combinations of advertisers and publication channels. At a block 1120, the phone numbers are provided and utilized in a fashion that at least some of the phone numbers are each utilized for two or more combinations of advertisers and publication channels. At a block 1130, calls made to the provided phone numbers are received. At a block 1140, the system provides an estimate of a number of calls associated with a publication channel based on an analysis of the received calls.

Figure 12A:
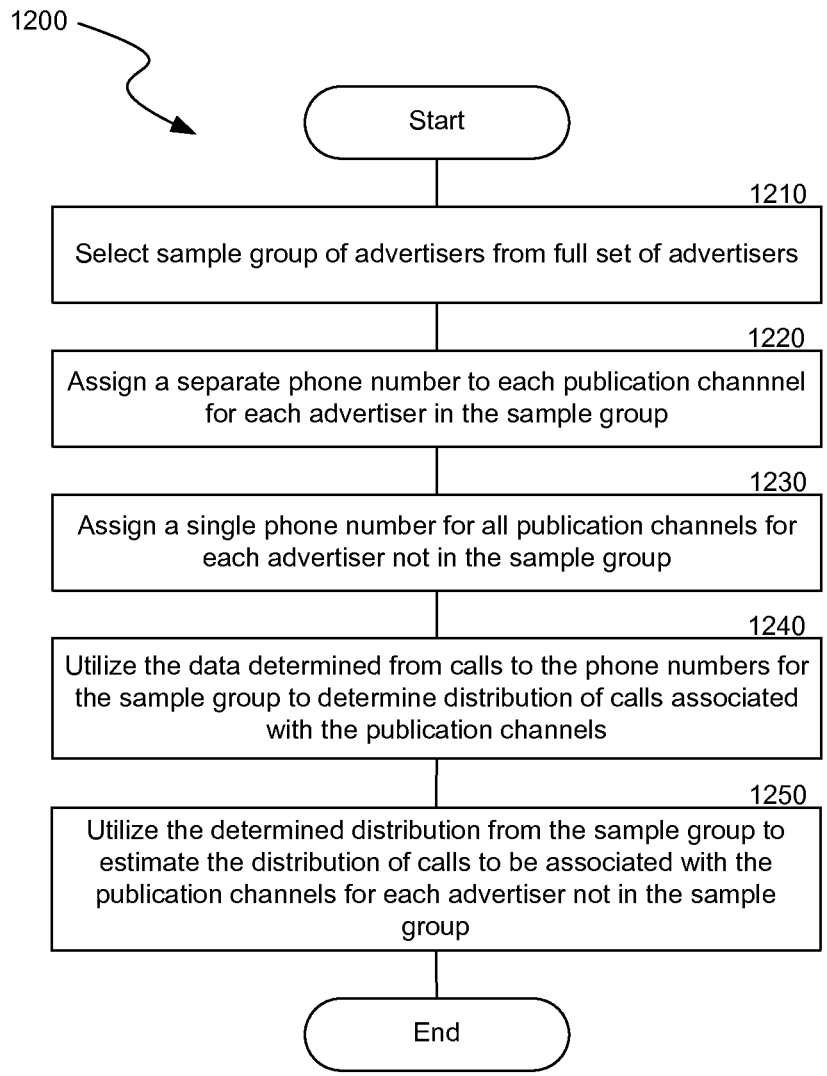
FIGS. 12A and 12B are flowcharts showing sampling methods using advertisers or advertisements to determine a distribution of calls associated with publication channels.

FIG. 12A is a flowchart showing a method 1200 implemented by the call tracking system 115 that utilizes a sample group of advertisers to determine a distribution of calls associated with publication channels. At a block 1210, a sample group of advertisers are selected from a full set of advertisers. The sample group may be selected at random, or may be selected to obtain a representative set of advertisers based on size, location, products or services sold, sales volume, etc. At a block 1220, the system assigns a separate phone number to each publication channel for each advertiser in the sample group. At a block 1230, the system assigns a single phone number for all publication channels for each advertiser not in the sample group. At a block 1240, the system uses call data to the phone numbers for the sample group to determine a distribution of calls associated with the publication channels. That is, the system ascertains the number of calls placed to advertisers in response to phone numbers distributed via each publication channel. At a block 1250, the determined distribution from the sample group is utilized by the system to estimate the distribution of calls associated with the publication channels for each advertiser not in the sample group. A specific illustration of the method 1200 will be described in more detail below with respect to FIG. 13. Once an estimate of the publication channel distribution has been generated by the system, the system may use the distribution to provide improved services to advertisers. The system may, for example, provide distribution reporting and tools to advertisers to allow the advertiser to better optimize its advertising purchases. Advertisers may shift advertising to those distribution channels that are shown to be more effective for the type of advertisement being placed. The system may also use the distribution data to deliver appropriate revenue share to partners, ensuring that partners having higher effectiveness distribution channels are compensated more than distribution partners having lower effectiveness distribution channels.

Figure 12B:
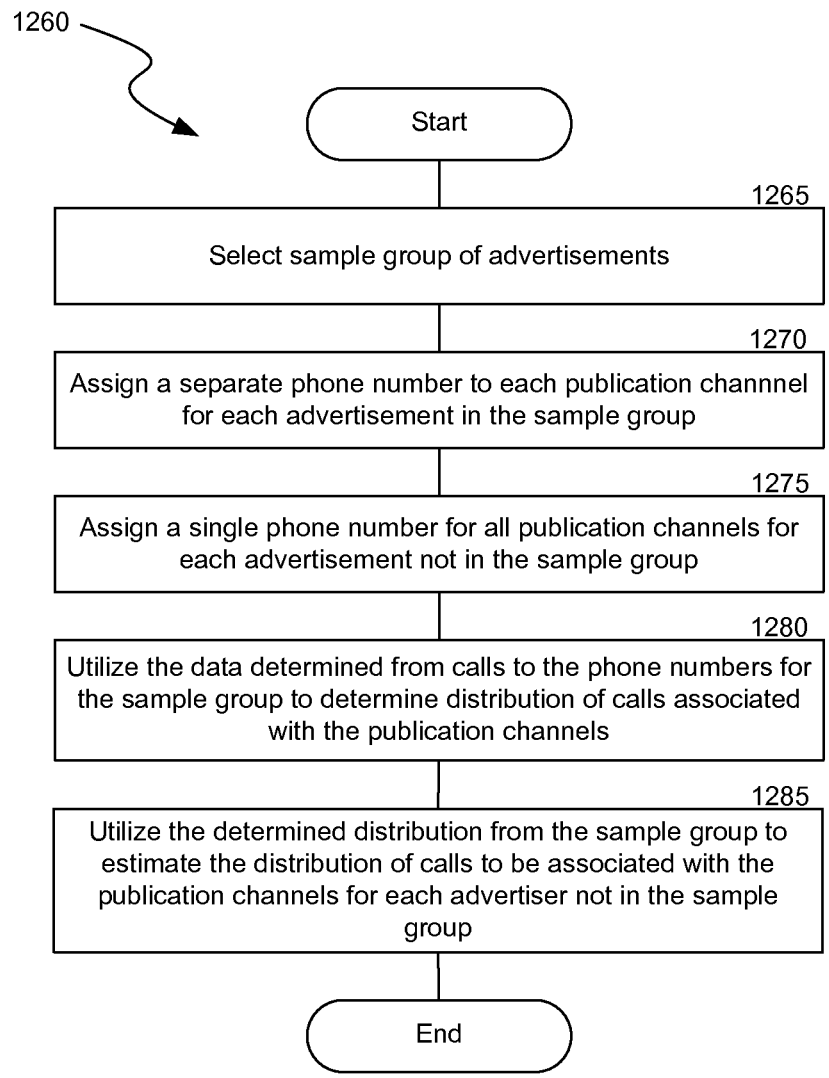

In addition to, or in lieu of, a sampling algorithm based on advertisers described in FIG. 12A, the system may use a sampling algorithm that is based on a percentage of ad requests associated with an advertiser. FIG. 12B is a flowchart showing a method 1260 implemented by the call tracking system 115 that utilizes a sample group of advertisements associated with one or more advertisers to determine a distribution of calls associated with publication channels. At a block 1265, a sample group of advertisements is selected by the system. The sample group may be selected by the system at random from ad requests associated with a particular advertiser (e.g., each ad request has a 10% chance of being selected), or may be selected using a regular selection technique (e.g., every 10th ad request is selected). In some embodiments, only advertisers having a minimum threshold number of ad requests are selected for sampling based on a percentage of ad requests. Selecting advertisers above a minimum threshold (e.g., advertisers typically receiving above 1000 ad requests) helps ensure that the selected advertisers are likely to generate a sufficient number of ad requests for the sample group to be statistically significant. At a block 1270, the system assigns a separate phone number to each publication channel for each advertisement in the sample group. At a block 1275, the system assigns a single phone number for all publication channels for each advertisement not in the sample group. At a block 1280, the system uses call data to the phone numbers for the sample group to determine a distribution of calls associated with the publication channels. That is, the system ascertains the number of calls placed in response to phone numbers distributed via each publication channel. At a block 1285, the determined distribution from the sample group is utilized by the system to estimate the distribution of calls associated with the publication channels for each advertisement not in the sample group.

Figure 13:
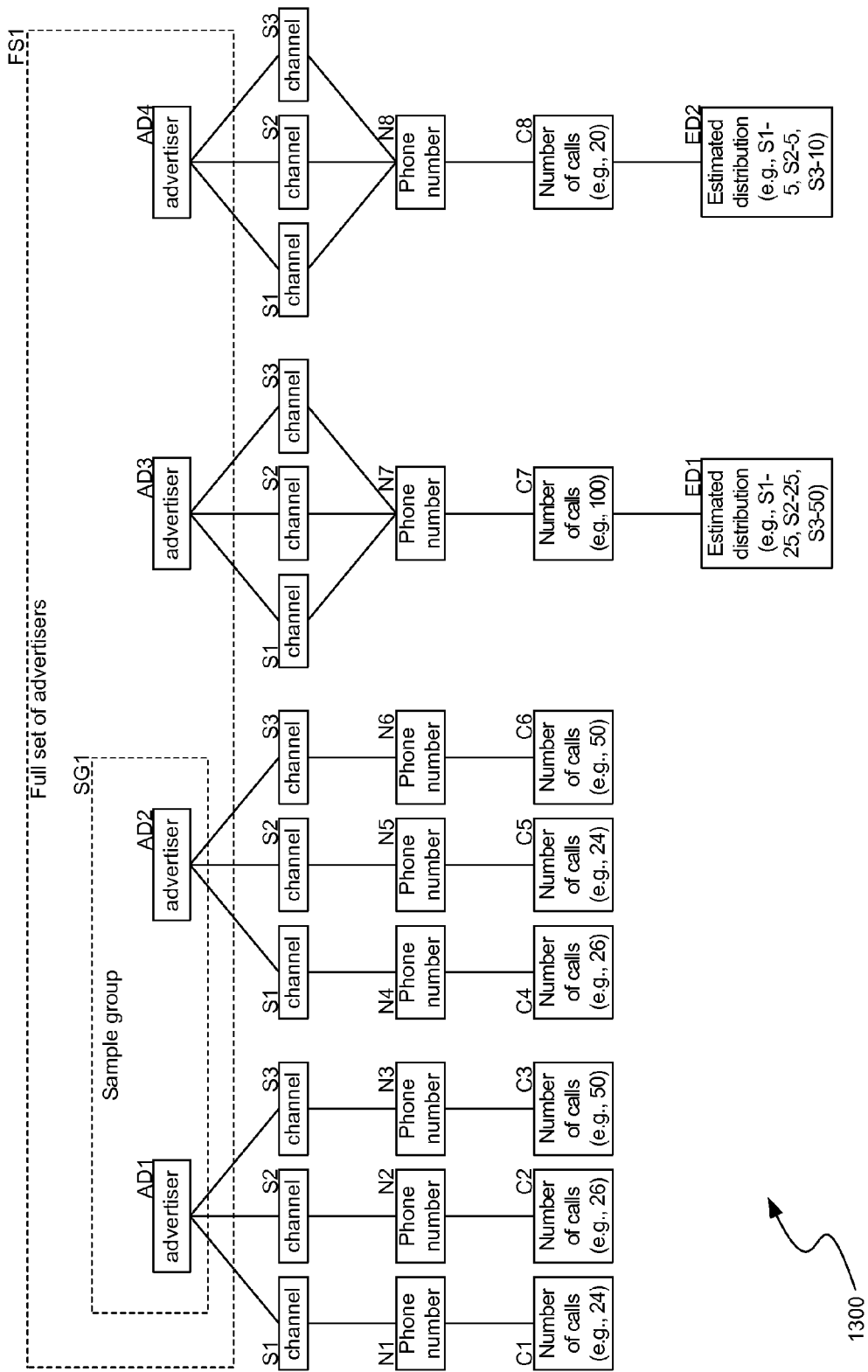
FIG. 13 is a diagram illustrating relationships between publication channels and phone numbers for advertisers in a sample group and advertisers not in a sample group.

FIG. 13 is a diagram illustrating conceptual relationships 1300 between publication channels and phone numbers for advertisers in a sample group and advertisers not in a sample group. As shown in FIG. 13, a full set of advertisers FS1 includes four advertisers AD1, AD2, AD3 and AD4. Advertisers AD1 and AD2 are illustrated as being included in a sample group SG1, and advertisers AD3 and AD4 are not included in the sample group. Each of the advertisers AD1, AD2, AD3 and AD4 are associated with publication channels S1, S2 and S3.

For the advertisers AD1 and AD2 in the sample group SG1, a call tracking telephone number is assigned to each publication channel. More specifically, for the advertiser AD1, the publication channel S1 is assigned a phone number N1, the publication channel S2 is assigned a phone number N2, and the publication channel S3 is assigned a phone number N3. Similarly, for the advertiser AD2, the publication channel S1 is assigned a phone number N4, the publication channel S2 is assigned a phone number N5, and the publication channel S3 is assigned a phone number N6. In contrast, the advertisers AD3 and AD4 (which are not in the sample group) have only a single call tracking phone number utilized for all of the publication channels. More specifically, for the advertiser AD3 each of the publication channels S1, S2 and S3 is assigned a single phone number N7. Similarly, for the advertiser AD4, each of the publication channels S1, S2 and S3 is assigned a single phone number N8.

In operation, data is obtained from the sample group of advertisers in order to model the performance (i.e., the distribution of calls from the publication channels) across all of the advertisers. In various implementations, the distribution of calls may be determined according to the following method. For the advertiser AD1, the phone numbers N1, N2 and N3 receive a number of calls $C1$, $C2$ and $C3$, respectively, and for the advertiser AD2, the phone numbers N4, N5 and N6 receive a number of calls $C4$, $C5$ and $C6$, respectively. As a specific illustration, example numbers may be provided such as $C1=24$, $C2=26$, $C3=50$, $C4=26$, $C5=24$ and $C6=50$. By averaging the number of calls from each of the publication channels for the two advertisers AD1 and AD2 in the sample group, the determined distribution for the publication channels S1, S2 and S3, is approximately 25%, 25% and 50% of the total number of phone calls, respectively.

Utilizing this determined distribution, the number of calls to be associated with the publication channels S1, S2 and S3 for the advertisers AD3 and AD4 which are not in the sample group can be estimated. For the advertiser AD3, the phone number N7 receives a number of calls C7, and for the advertiser AD4, the phone number N8 receives a number of calls C8. In accordance with the specific illustration, if C7=100, the estimated distribution ED1 for the advertiser AD3 would be S1=25, S2=25 and S3=50, in accordance with the 25%, 25% and 50% respective distribution as determined from the sample group SG1. Similarly, if C8=20, the estimated distribution ED2 for the advertiser AD4 would be S1=5, S2=5 and S3=10, in accordance with the 25%, 25% and 50% distribution determined from the sample group SG1.

It will be appreciated that the use of this type of sampling algorithm may be particularly beneficial when there is no need to calculate the efficiency for an individual advertiser, but instead a desire to calculate efficiency across a larger set of advertisers to determine the overall performance of the publisher. For example, when there is a large set of publication channels (e.g., thousands), but for each advertiser only a limited number of calls is received (e.g., five calls per month), it may be inefficient to assign an individual phone number to each publication channel. Instead, by utilizing the sampling algorithm illustrated with respect to FIGS. 12 and 13, the performance of the publication channels may be estimated utilizing the distribution determined from the sample group as applied to the total number of phone calls received by the advertisers.

Figure 14:
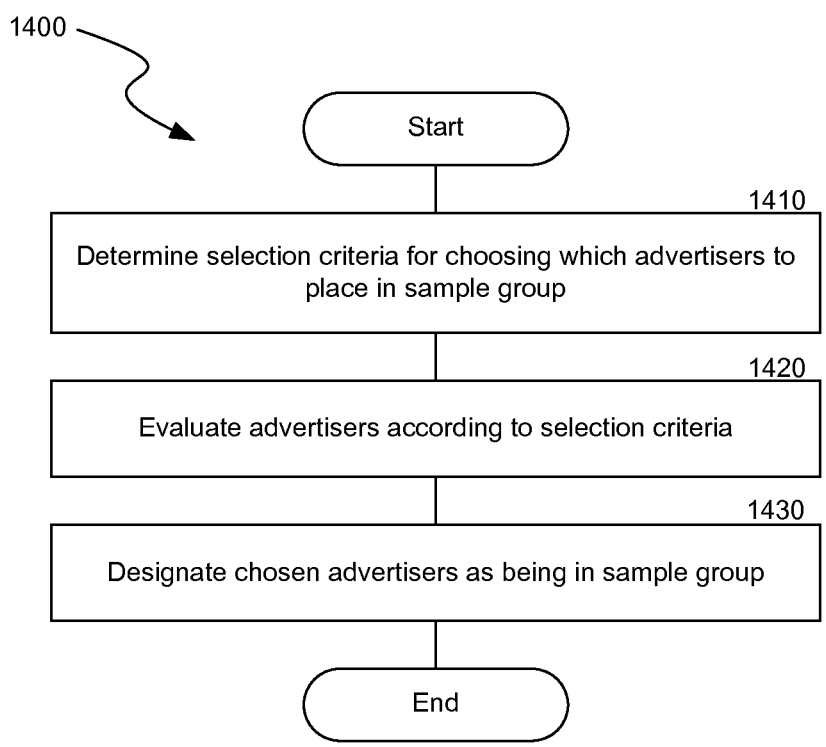
FIG. 14 is a flowchart showing a method for determining which advertisers will be included in a sample group.

FIG. 14 is a flowchart showing a method 1400 implemented by the call tracking system 115 for determining which advertisers will be included in a sample group. At a block 1410, the system receives one or more selection criteria that is used to choose which advertisers to place in a sample group. For example, one selection criteria may be directed toward placing the highest volume advertisers in the sample group in order to increase the distribution data. Other selection criteria could be to select a group of advertisers that individually or collectively have historically tracked close to the overall industry. The selection criteria may be entered by a system operator, or may be stored selection criteria settings that are retrieved by the system. At a block 1420, the system evaluates the advertisers according to the received selection criteria. At a block 1430, the advertisers that satisfy the selection criteria are designated by the system as being in sample group.

Figure 15:
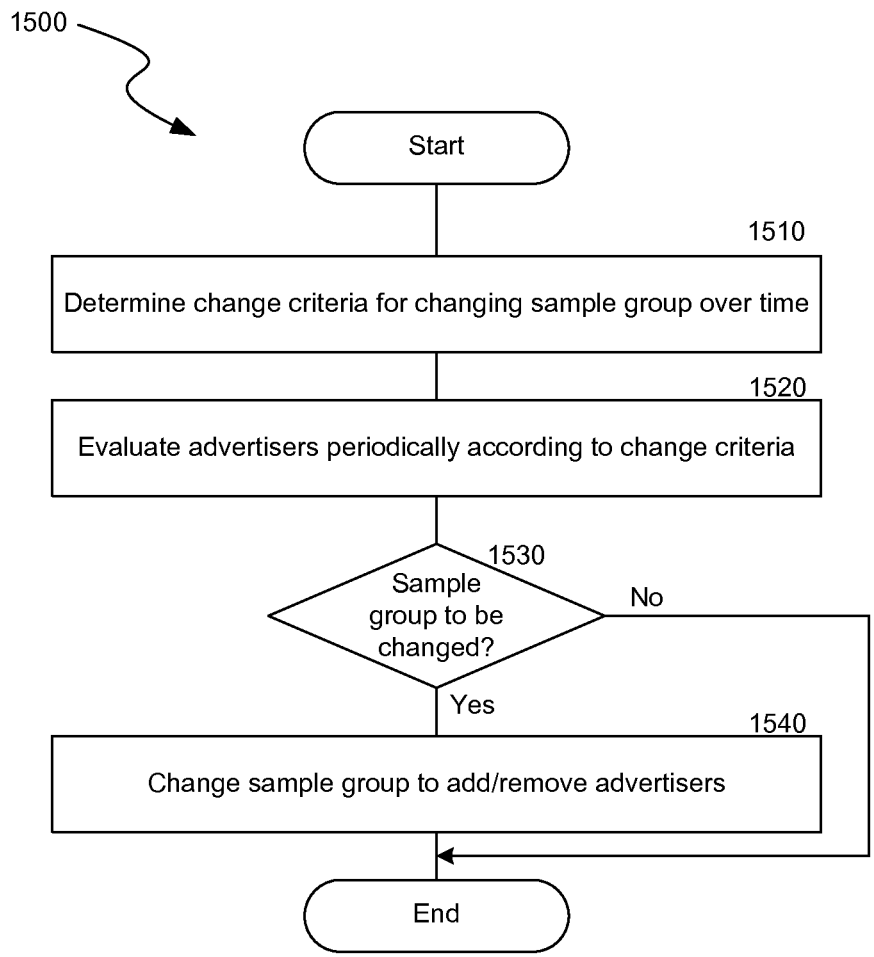
FIG. 15 is flowchart showing a method for changing a sample group over time.

FIG. 15 is flowchart showing a method 1500 implemented by the call tracking system 115 for changing a sample group over time. At a block 1510, the system receives one or more change criteria that specify how the sample group is changed over time. For example, the change criteria may be directed toward rotating the advertisers through the sample group, periodically evaluating an advertiser's volume to see if should be added/removed from sample group, etc. The change criteria may be entered by a system operator, or may be stored change criteria settings that are retrieved by the system. It will be appreciated that by rotating advertisers through the sample group, the call distribution patterns can be verified as being consistent across different advertisers. At a block 1520, the system periodically evaluates the advertisers according to the change criteria. At a decision block 1530, a determination is made by the system as to whether the sample group is to be changed. If the sample group is not to be changed, then processing ends. If the sample group is to be changed, then processing continues to a block 1540, where the sample group is changed by the system to add/remove advertisers.

Figure 16:
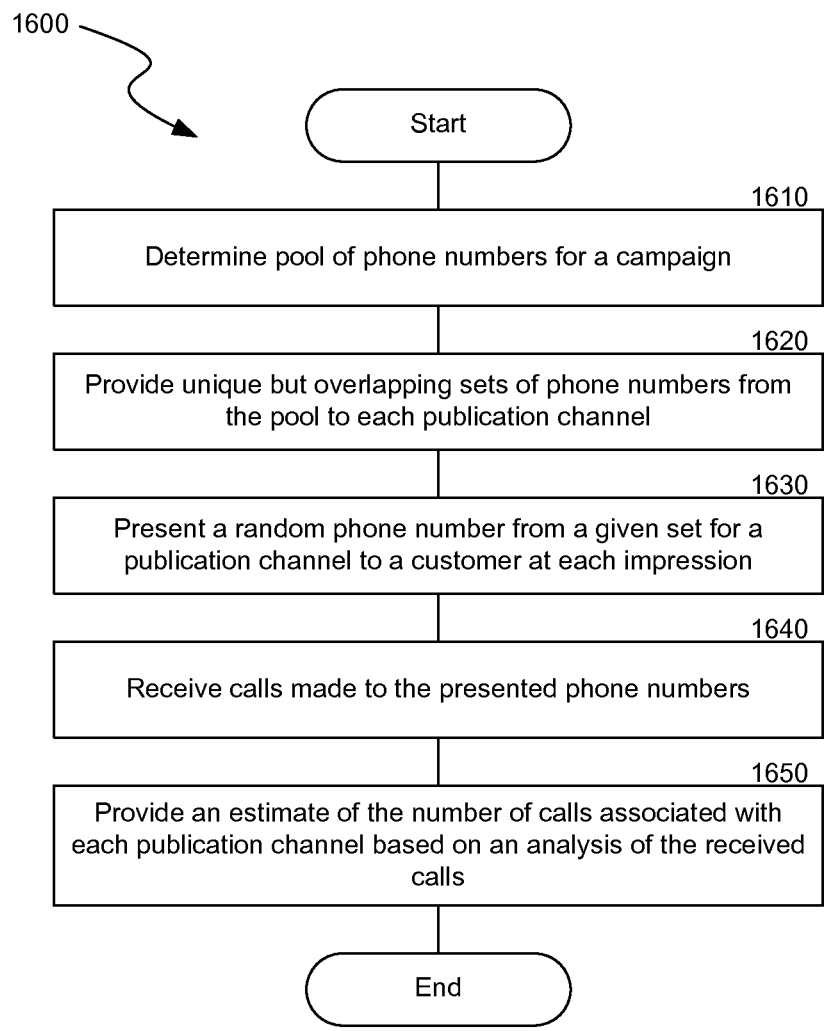
FIG. 16 is flowchart showing a method that utilizes pooled signal processing for estimating a number of calls associated with publication channels.

FIG. 16 is flowchart showing a method 1600 implemented by the call tracking system 115 that uses signal processing to estimate a number of calls associated with publication channels. At a block 1610, a pool of phone numbers is selected by the system for a campaign. At a block 1620, the system provides unique but overlapping sets of phone numbers from the pool to each publication channel. At a block 1630, the system presents a random phone number from a set for a given publication channel to a customer at each impression. At a block 1640, the system receives information about calls made to the presented phone numbers. At a block 1650, an estimate of the number of calls associated with each publication channel is provided by the system based on an analysis of the received calls. The estimate is based on the sample provided by detecting whether the random phone number was used for each publication channel. In some embodiments, the estimate may be determined using a best fit algorithm.

Figure 17:
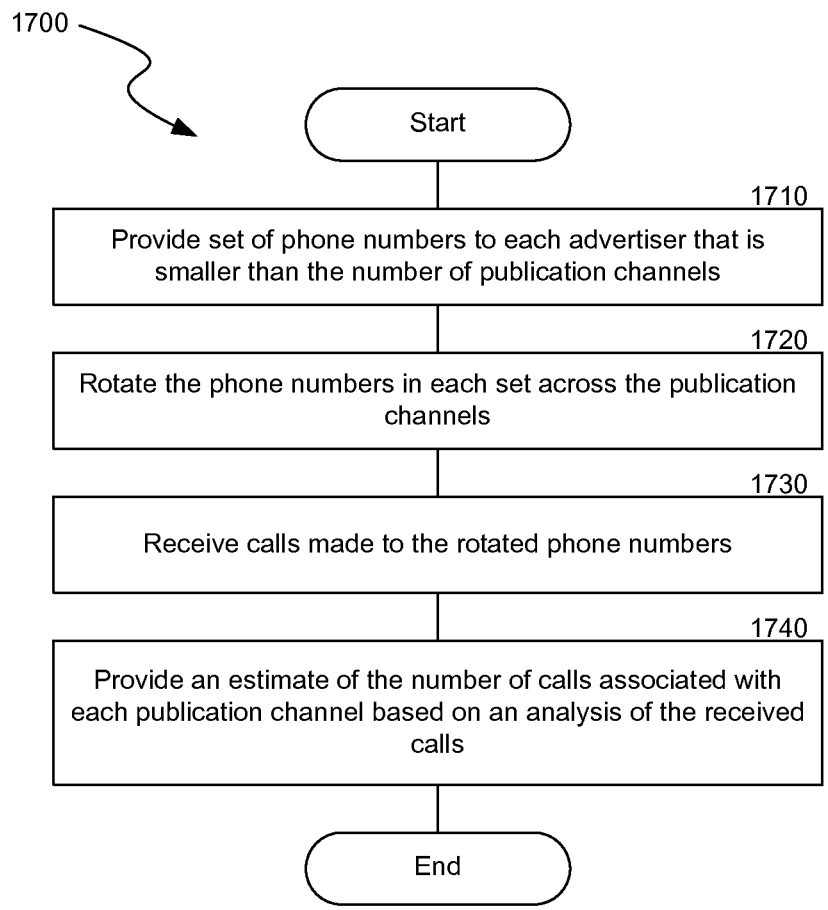
FIG. 17 is a flowchart showing a method that utilizes dynamic signal processing for estimating a number of calls associated with publication channels.

FIG. 17 is a flowchart showing a method 1700 implemented by the call tracking system 115 that uses dynamic signal processing to estimate a number of calls associated with publication channels. At a block 1710, a set of phone numbers is associated by the system to each advertiser. The associated set of phone numbers is smaller than the number of publication channels for which the phone numbers will be utilized. At a block 1720, the phone numbers are rotated in each set across the publication channels. At a block 1730, the system receives information about calls made to the rotated phone numbers. At a block 1740, an estimate of the number of calls associated with each publication channel is provided by the system based on an analysis of the received calls. In some embodiments, the estimate may be determined using an algorithm to determine the percentage of calls associated with each publication channel.

From the foregoing, it will be appreciated that specific embodiments of the invention have been described herein for purposes of illustration, but that various modifications may be made without deviating from the scope of the invention. Those skilled in the art will appreciate that the operations and routines depicted in flowchart blocks and otherwise described herein may be altered in a variety of ways. More specifically, the order of the steps may be re-arranged, steps may be performed in parallel, steps may be omitted, other steps may be included, various combinations or omissions of routines may be made, etc. Accordingly, the invention is not limited except as by the appended claims.

We claim:

1. A method in a computing system for adjusting a pool of phone numbers utilized for call tracking, the method comprising:
providing a pool of phone numbers to be allocated for inclusion in advertisements;
storing one or more tracking parameters that enable a call to one of the plurality of phone numbers to be correlated with a particular publication channel in which an advertisement containing the phone number was published when calls to the phone numbers are received;
evaluating the pool of phone numbers according to pool evaluation criteria for dynamically adjusting the number of phone numbers allocated to the pool to determine whether the size of the pool should be adjusted, the pool evaluation criteria being selected from an accuracy of correlating the phone numbers with publication channels, a cost to maintain the pool of phone numbers, or both an accuracy of correlating the phone numbers with publication channels and a cost to maintain the pool of phone numbers;

adjusting the pool of phone numbers by adding one or more phone numbers to the pool or removing one or more phone numbers from the pool if the evaluation indicates that the pool should be adjusted; and providing phone numbers from the pool in response to requests for call tracking.

2. The method of claim 1, wherein the adjustment to the pool adds one or more phone numbers to the pool if the accuracy of correlating the phone numbers with publication channels is to be increased and removes one or more phone numbers from the pool if the accuracy of correlating the phone numbers with publication channels is to be decreased.

3. The method of claim 1, wherein the adjustment to the pool further comprises changes the composition of the pool so that the average length of time since last use of the phone numbers in the pool increases if the accuracy of correlating the phone numbers with publication channels is to be increased and the average length of time since last use of the phone numbers in the pool decreases if the accuracy of correlating the phone numbers with publication channels is to be decreased.

4. The method of claim 1, wherein the level of accuracy of correlating the phone numbers with publication channels is expressed as a percentage of calls that are correctly correlated.

5. The method of claim 1, wherein the level of accuracy of correlating the phone numbers with publication channels is used to assess a financial cost associated with the publication channel or used to assess a financial cost associated with the pool of phone numbers.

6. The method of claim 1, wherein phone numbers are assigned from the pool to members of the designated group according to assignment criteria.

7. The method of claim 6, wherein the assignment criteria is related to increasing reuse of phone numbers for the same assignees.

8. The method of claim 6, wherein the assignment criteria is related to selecting a phone number according to how long it has been unused.

9. The method of claim 1, wherein phone numbers are assigned from the pool to members of the designated group in a random fashion.

10. The method of claim 1, wherein phone numbers are assigned from the pool to members of the designated group in a round-robin fashion.

11. The method of claim 1, further comprising:
after assigning phone numbers from the pool, periodically evaluating the assigned phone numbers to determine if they should be returned to the pool.

12. The method of claim 11, wherein the evaluation comprises determining the length of time since the phone number was provided for call tracking and returning the phone number to the pool if the length of time is over a predetermined threshold.

13. The method of claim 1, further comprising if the pool is to be adjusted by removing phone numbers from the pool but the number of currently available phone numbers in the pool is below a threshold, waiting until phone numbers are returned to the pool and the phone numbers in the pool exceed the threshold before removing phone numbers from the pool.

14. A computer readable storage medium with instructions stored thereon that, when executed by a computing system, cause the computing system to perform a method of adjusting a pool of phone numbers utilized for call tracking, the method comprising:

providing a pool of phone numbers to be allocated for inclusion in advertisements;

storing one or more tracking parameters that enable a call to one of the plurality of phone numbers to be correlated with a particular publication channel in which an advertisement containing the phone number was published when calls to the phone numbers are received;

evaluating the pool of phone numbers according to pool evaluation criteria for dynamically adjusting the number of phone numbers allocated to the pool to determine whether the size of the pool should be adjusted, the pool evaluation criteria being selected from an accuracy of correlating the phone numbers with publication channels, a cost to maintain the pool of phone numbers, or both an accuracy of correlating the phone numbers with publication channels and a cost to maintain the pool of phone numbers;

adjusting the pool of phone numbers by adding one or more phone numbers to the pool or removing one or more phone numbers from the pool if the evaluation indicates that the pool should be adjusted; and providing phone numbers from the pool in response to requests for call tracking.

15. A computer readable storage medium of claim 14, wherein the adjustment to the pool adds one or more phone numbers to the pool if the accuracy of correlating the phone numbers with publication channels is to be increased and removes one or more phone numbers from the pool if the accuracy of correlating the phone numbers with publication channels is to be decreased.

16. A computer readable storage medium of claim 14, wherein the adjustment to the pool further comprises changes the composition of the pool so that the average length of time since last use of the phone numbers in the pool increases if the accuracy of correlating the phone numbers with publication channels is to be increased and the average length of time since last use of the phone numbers in the pool decreases if the accuracy of correlating the phone numbers with publication channels is to be decreased.

17. A computer readable storage medium of claim 14, wherein the level of accuracy of correlating the phone numbers with publication channels is expressed as a percentage of calls that are correctly correlated.

18. A computer readable storage medium of claim 14, wherein the level of accuracy of correlating the phone numbers with publication channels is used to assess a financial cost associated with a publication channel or used to assess a financial cost associated with the pool of phone numbers.

19. A computer readable storage medium of claim 14, wherein phone numbers are assigned from the pool to members of the designated group according to assignment criteria.

20. A computer readable storage medium of claim 19, wherein the assignment criteria is related to increasing reuse of phone numbers for the same assignees.

21. A computer readable storage medium of claim 19, wherein the assignment criteria is related to selecting a phone number according to how long it has been unused.

22. The computer readable storage medium of claim 14, wherein phone numbers are assigned from the pool to members of the designated group in a random fashion.

23. The computer readable storage medium of claim 14, wherein phone numbers are assigned from the pool to members of the designated group in a round-robin fashion.

24. A computer readable storage medium of claim 14, further comprising instructions stored thereon that, when executed by a computing system, cause the computing system to:
    after assigning phone numbers from the pool, periodically evaluate the assigned phone numbers to determine if they should be returned to the pool.

25. A computer readable storage medium of claim 24, wherein the evaluation comprises determining the length of time since the phone number was provided for call tracking and returning the phone number to the pool if the length of time is over a predetermined threshold.

26. A computer readable storage medium of claim 14, further comprising instructions stored thereon that, when executed by a computing system, cause the computing system to:
    if the pool is to be adjusted by removing phone numbers from the pool but the number of currently available phone numbers in the pool is below a threshold, wait until phone numbers are returned to the pool and the phone numbers in the pool exceed the threshold before removing phone numbers from the pool.

\* \* \* \* \*